US012801127B2

(12) United States Patent
Iustin

(10) Patent No.: US 12,801,127 B2
(45) Date of Patent: Nov. 17, 2026

(54) LOCALIZATION OF AN ASSEMBLY LINE TOOL

(71) Applicant: VOLVO TRUCK CORPORATION, Gothenburg (SE)

(72) Inventor: Roman Iustin, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 307 days.

(21) Appl. No.: 18/581,847

(22) Filed: Feb. 20, 2024

(65) Prior Publication Data

US 2024/0288856 A1 Aug. 29, 2024

(30) Foreign Application Priority Data

Feb. 28, 2023 (EP) .................................... 23159150

(51) Int. Cl.
*G05B 19/418* (2006.01)
*G01S 17/42* (2006.01)

(52) U.S. Cl.
CPC ........ *G05B 19/41865* (2013.01); *G01S 17/42* (2013.01); *G05B 2219/31031* (2013.01)

(58) Field of Classification Search
CPC .... G05B 19/41865; G05B 2219/31031; G01S 17/42
See application file for complete search history.

(56) References Cited

U.S. PATENT DOCUMENTS

| | | | | |
|---|---|---|---|---|
| 10,213,884 | B2 * | 2/2019 | Kogushi | B25J 9/1687 |
| 2015/0253766 | A1 | 9/2015 | Pettersson et al. | |
| 2016/0297617 | A1 * | 10/2016 | Kempf | B65G 43/00 |
| 2021/0056682 | A1 | 2/2021 | Ward | |
| 2021/0232989 | A1 | 7/2021 | Rana et al. | |

FOREIGN PATENT DOCUMENTS

| | | | |
|---|---|---|---|
| EP | 2311714 | A1 | 4/2011 |
| GB | 2245205 | A | 1/1992 |
| JP | S6124679 | A | 2/1986 |

OTHER PUBLICATIONS

Extended European Search Report in corresponding European Application No. 23159150.4 dated Aug. 3, 2023 (10 pages).
European Communication pursuant to Article 94(3) EPC dated May 15, 2026 in corresponding European Patent Application No. 23159150.4, 6 pages.

* cited by examiner

*Primary Examiner* — Gertrude Arthur Jeanglaude
(74) *Attorney, Agent, or Firm* — Jeffri A. Kaminski; Venable LLP

(57) ABSTRACT

An assembly line arrangement includes an assembly line tool attached to a movable trolley guided by roof-mounted rails. The arrangement has one or more first range detectors mounted on the roof-mounted rails and/or trolley in order to determine the position of the trolley in a plane defined by the roof-mounted rails, and one or more second range detectors mounted on the trolley in order to determine the location of a chassis of a vehicle on an assembly line.

14 Claims, 8 Drawing Sheets

LOCALIZATION OF AN ASSEMBLY LINE TOOL

TECHNICAL FIELD

The disclosure relates generally to the manufacturing of vehicles. In particular aspects, the disclosure relates to the localization of an assembly line tool. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

In manufacturing using assembly lines, it is important to track the position and usage of a tool in use on the assembly line to ensure that the right tool is used in the right way for all assembly steps. Various tracking and positioning implementations of tools on an assembly line are in use today, such as comparing pre-recorded images with live camera feeds and equipping the tool and/or vehicle to be assembled with various position and distance sensors.

Assembly line tools can be integrated in an IT system that coordinates tool sequence and/or work order. Correct assembly is possible only if an operator follows the predetermined sequence. However, there is no quality check that operator follow the correct steps. There is thus a need to improve the localization of an assembly tool to ensure proper usage.

SUMMARY

According to a first aspect of the disclosure, an assembly line arrangement comprises an assembly line tool attached to a movable trolley guided by roof-mounted rails. The arrangement further comprises one or more first range detectors mounted on the roof-mounted rails and/or trolley in order to determine the position of the trolley in a plane defined by the roof-mounted rails, and one or more second range detectors mounted on the trolley in order to determine the location of a chassis of a vehicle on an assembly line. The first aspect of the disclosure may seek to provide an assembly line arrangement that aids in increasing the accuracy and quality of assembly of heavy-duty vehicles. A technical benefit may include a simple and easy location solution for an assembly line tool attached to a movable trolley guided by roof-mounted rails, as well as a simple and easy quality assurance of the correct usage of the assembly line tool at an assembly line.

In some examples, including in at least one preferred example, optionally the one or more first range detectors are laser range meters and/or actuators. A technical benefit may include that it is easy to integrate such range detectors and that they can be adapted to a variety of specific environments.

In some examples, including in at least one preferred example, optionally the one or more second range detectors are LIDAR sensors and/or optical cameras. A technical benefit may include that it is easy to integrate such range detectors and that they can be adapted to a variety of specific environments.

In some examples, including in at least one preferred example, optionally the assembly line tool is a spindle tool comprising a plurality of spindles for tightening bolts of a wheel to the chassis of the vehicle. A technical benefit may include that the tool provides an easy way of ensuring that the bolts are tightened with a correct torque for each wheel.

In some examples, including in at least one preferred example, optionally the arrangement comprises an image capturing unit for determining the position of an axle of a chassis of the vehicle. A technical benefit may include that the tool can be positioned next to an axle to ensure that the tool is aligned with the correct axle of the vehicle and that the correct torque is used for the wheel of that specific axle.

According to a second aspect of the disclosure, a computer-implemented method for ensuring correct usage of an assembly line tool at a workstation of an assembly line, wherein the assembly line tool is attached to a movable trolley guided by roof-mounted rails, comprises:

- determining a location of the assembly line tool based on the position of the trolley in a plane defined by the roof mounted rails;
- determining a location of a chassis of a vehicle at the work station;
- determining a relation between the determined location of the assembly line tool and the determined location of the chassis at the assembly line work station; and,
- based on the determined relation between the determined location of the assembly line tool and the determined location of a vehicle chassis at the assembly line work station, locating the assembly line tool relative to the vehicle chassis for correct usage of the assembly line tool. The second aspect of the disclosure may seek to provide a method that that aids in increasing the accuracy and quality of assembly of heavy-duty vehicles. A technical benefit may include ensuring a simple and easy location solution for an assembly line tool attached to a movable trolley guided by roof-mounted rails, as well as a simple and easy quality assurance of the correct usage of the assembly line tool at an assembly line.

In some examples, including in at least one preferred example, optionally wherein locating the assembly line tool relative to the vehicle chassis for the correct usage of the assembly line tool, the method may comprise:

comparing the relation between the determined location of the assembly line tool and the determined location of a vehicle chassis at the assembly line work station with a predefined operating procedure of the assembly line tool in relation to the vehicle chassis. A technical benefit may include assisting an assembly line worker in knowing that the correct operating procedure is used.

In some examples, including in at least one preferred example, optionally the method may comprise: determining a location of an axle on the chassis of the vehicle.

In some examples, including in at least one preferred example, optionally determining a location of an axle on the chassis of the vehicle may comprise:

- capturing an image of the chassis with an image capturing unit, and
- determining the position of the axle of the chassis of the vehicle by image recognition. A technical benefit may include that it is possible to determine the axle position and thereby to determine the correct torque needed for the assembly of the wheel.

In some examples, including in at least one preferred example, optionally wherein determining the location of the assembly line tool based on the position of the trolley in a plane defined by the roof mounted rails the method may comprise:

- determining the location of the assembly line tool using one or more first range detectors being laser range meters and/or actuators. A technical benefit may include that it is easy to integrate and that can be adapted to a variety of specific environments.

In some examples, including in at least one preferred example, optionally wherein determining the location of the chassis of the vehicle at the work station; determining the location of the chassis using the one or more second range detectors being LIDAR sensors and/or optical cameras. A technical benefit may include that it is easy to integrate such sensors and that they can be adapted to a variety of specific environments.

In some examples, including in at least one preferred example, optionally the assembly line tool is spindle tool comprising a plurality of spindles for tightening bolts of a wheel to the chassis of the vehicle. A technical benefit may include that the tool provides an easy way of ensuring that the bolts are tightened with a correct torque.

According to a third aspect of the disclosure, a computer-implemented assembly line tool localization system comprises:

- a controller configured to connect the localisation system to the one or more first and second range detectors of the arrangement according to any one of the above claims;
- memory;
- computer code;
- one or more processor(s) or processing circuitry; and
- a data communications transceiver arrangement connected to an antenna;
- wherein the computer code, when loaded from memory and executed by the one or more processors or processing circuitry, causes the localisation system to wirelessly connect to the one or more first and second range detectors and perform the above described methods. The third aspect of the disclosure may seek to the same problem as the method and provide the same technical benefit.

According to a fourth aspect of the embodiments herein, the object is achieved by a computer program product comprising instructions which, when executed in a processing circuitry, cause the processing circuitry to carry out the methods described above.

According to a fifth aspect of the embodiments herein, the object is achieved by a non-transitory computer-readable storage medium comprising instructions, which when executed by the processing circuitry, cause the processing circuitry to perform the methods described above.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein a computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
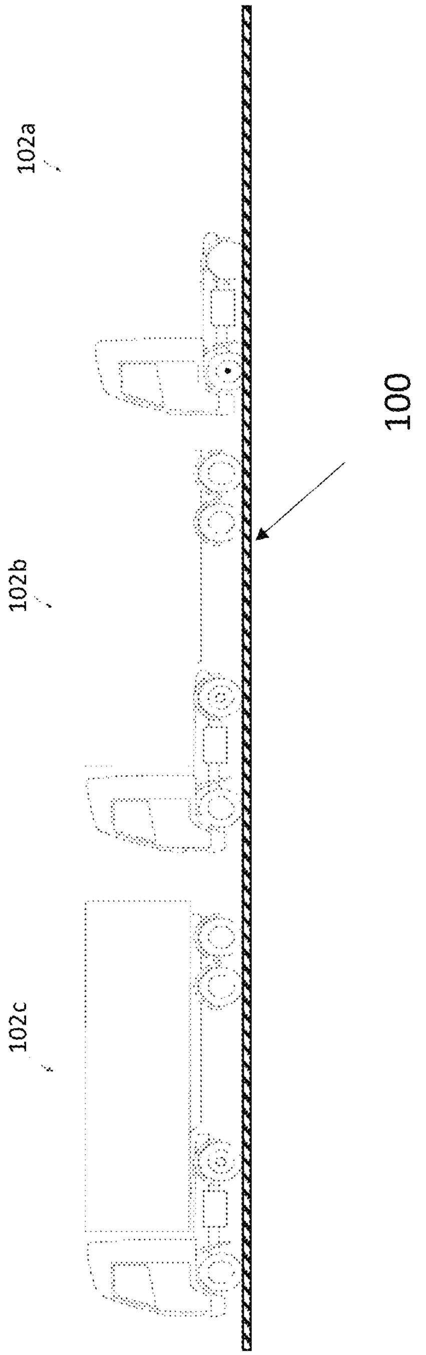
FIG. 1 is an exemplary overview of a manufacturing line for heavy-duty vehicle.

FIG. 1 is an exemplary overview of a manufacturing line for heavy-duty vehicles. In FIG. 1, an assembly line 100 can be seen with vehicle 102*a-c* in different stages of completion.

Figure 2A:
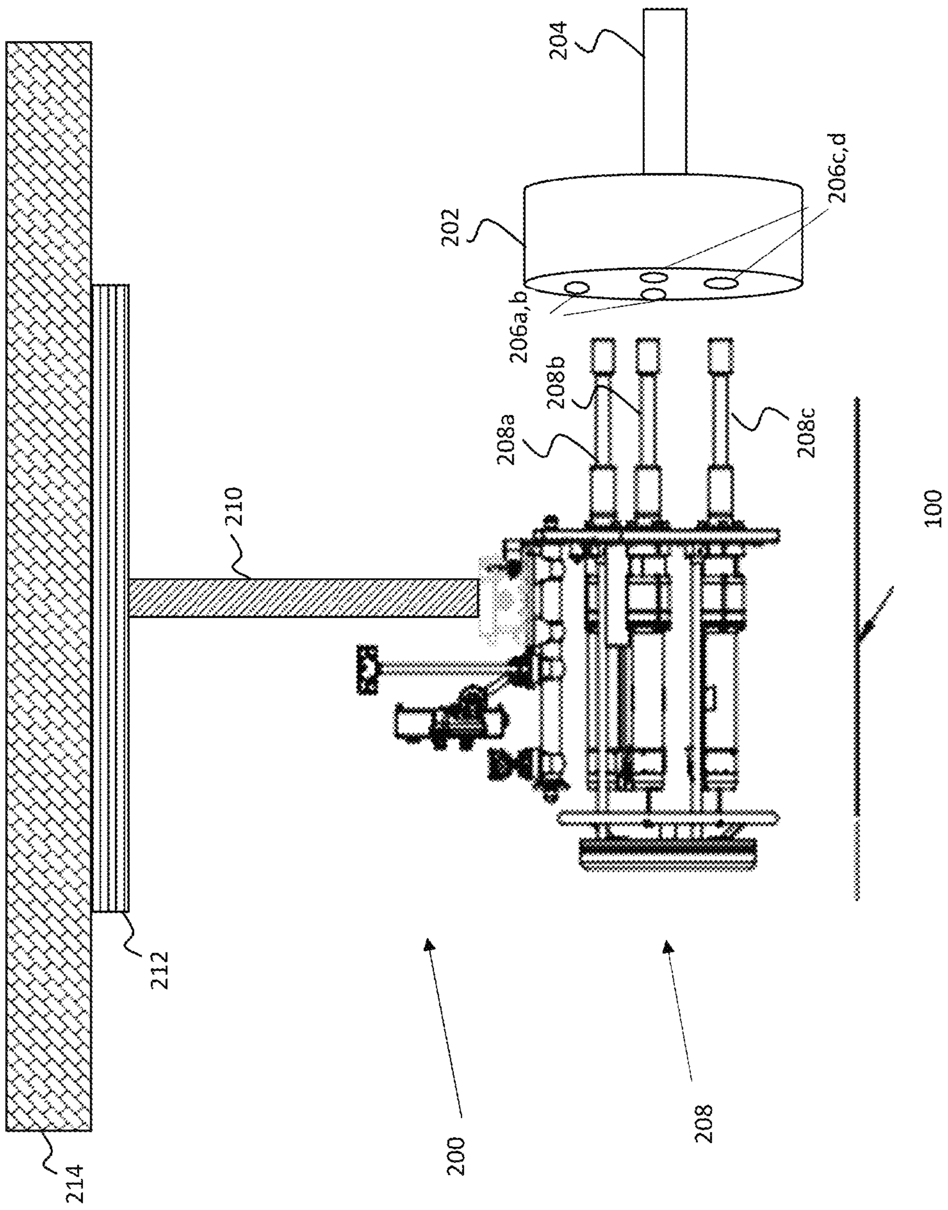
FIG. 2A is an exemplary overview of an arrangement comprising an assembly line tool attached to a movable trolley guided by roof-mounted rails.

FIG. 2A is an exemplary overview of an assembly line arrangement 200 arranged in a roof-mounted fashion suspended over the assembly line 100. A wheel 202 is arranged to be mounted to a chassis of a vehicle. The wheel 202 is arranged on an axle 204 of a vehicle 102 and is arranged to receive one or more bolts for fastening. Holes 206*a*-206*d* are shown as examples of where the bolts can be received in the wheel 202 for tightening against a corresponding wheel hub assembly on the axle 204. The assembly line tool 208 is according to one example a spindle tool arranged for tightening bolts of the wheel 202 to the chassis of a vehicle 102*a*-102*c* of FIG. 1. The assembly line tool 208 comprises a plurality of spindles 208*a*-208*c* and is attached via a spindle support strut 210 to a movable trolley or mount 212 which in turn is guided by a roof-mounted rail 214. The spindle tool may also be known as a nut runner and may comprise one to five spindles.

Figure 2B:
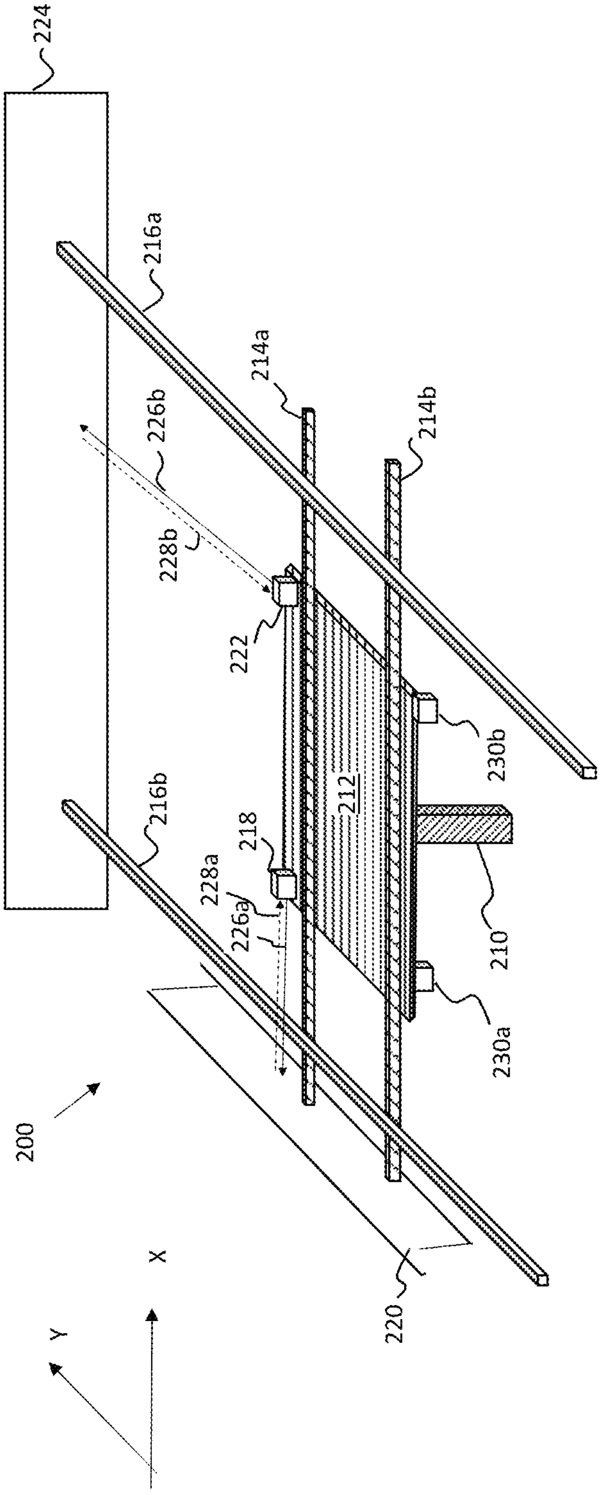
FIG. 2B is an exemplary overview of the movable trolley for an assembly line tool guided by roof-mounted rails.

FIG. 2B is an exemplary overview of the movable trolley 212 for an assembly line tool 208 guided by roof-mounted rails 214, 216. In FIG. 2B, the movable trolley 212 can be seen arranged on the roof-mounted rails 214, 216 which enables the trolley 212 to move in a plane defined by an x-axis and a y-axis as seen in the figure. The spindle support strut 210 supports the spindle tool (not shown).

The roof-mounted rails 214, 216 comprise a first and a second x-rail 214*a*, 214*b* and a first and second y-rail 216*a*, 216*b*. In the example of FIG. 2B, the trolley 212 is movably attached to the first and second x-rails 214*a*, 214*b* while the first and second x-rails 214*a*, 214*b* are movably attached to the first and second y-rails 216*a*, 216*b*. The opposite arrangement is of course possible. The trolley is movable by hand or by motors to a desired position.

The trolley 212 further comprises a first range detector 218 or an x-direction range detector arranged to measure the distance to an x-direction reflector 220 arranged perpendicular to the x-rails 214*a*, 214*b*, i.e. parallel to the y-rails 216*a*, 216*b*. The x-direction reflector 220 is arranged to provide a reference for the x-direction range detector 218 to determine where along the x-direction the trolley 212 is located.

Similarly, the trolley 212 further comprises a further first range detector 222 or a y-direction range detector arranged to measure the distance to a y-direction reflector 224 arranged perpendicular to the y-rails 216*a*, 216*b*, i.e. parallel to the x-rails 214*a*, 214*b*. The y-direction reflector 224 is arranged to provide a reference for the y-direction range detector 222 to determine where along the x-direction the trolley 212 is located.

Ranging beams 226*a,b* are projected from the x-direction range detector 218 and y-direction range detector 222 respectively. Return beams 228*a,b* provide the distances to the x-direction reflector 220 and y-direction reflector 224 respectively. The distances determine the location of the trolley with an x-coordinate and a y-coordinate. The one or more first range detectors (218, 222) are laser range detectors and/or actuators.

Further, two second range detectors 230*a,b* or cab range detectors are arranged on the trolley to determine the distance to the chassis of the vehicle that is to be assembled.

Figure 2C:
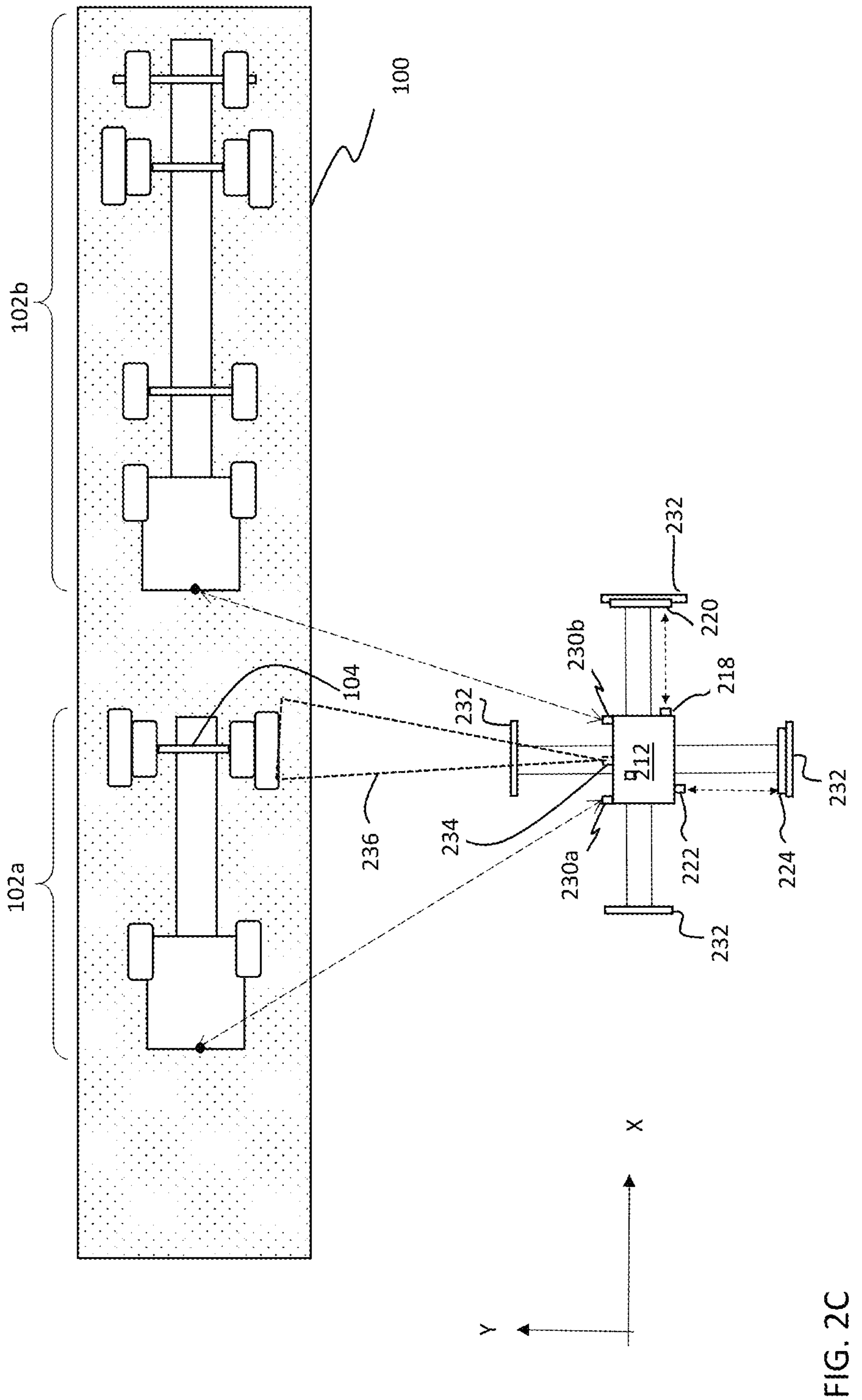
FIG. 2C is an exemplary overview over location detection of chassis on an assembly line.

FIG. 2C is an exemplary overview over location detection of chassis on an assembly line. Two trucks 102*a,b* with different axle configurations are positioned on the assembly line 100.

The trolley 212 with the spindle tool (not shown) is arranged at a distance from the assembly line 100. As described above, the x-direction range detector 218 and y-direction range detector 222 in combination with the x-direction reflector 220 and y-direction reflector 224 provide the location of the trolley as described above.

The cab range detectors 230*a,b* on the trolley 212 measures the distance to a predetermined point on each of the chassis of the trucks 102*a,b*, for instance to a midpoint of a cab of the vehicles 102*a,b*, thereby comparing the relation between the determined location of the trolley 212 with the spindle tool as obtained from the x-direction range detector 218 and y-direction range detector 222 with the location of a specific vehicle chassis 102*a,b* at a work station on the assembly line 100 with a predefined operating procedure of the spindle too in relation to the vehicle chassis 102*a,b*.

The arrangement 200 may further comprise an image capturing unit 234 for determining the position of an axle 104 of the chassis of the vehicle 102*a,b*. The image capturing unit 234 has a field of view 236 that is arranged to focus on one of the axles 104 of the vehicle 102*a,b* in order to determine the location of the axle 104. By comparing the image within the field of view 236 of the image capturing unit 234, the position of the axle can be determined by means of image recognition. In this way, the tool can be positioned next to a specific axle 104 to ensure that the tool is aligned with the correct axle of the vehicle and that the correct torque is used for the wheel of that specific axle.

For completeness, parts of rail supports 232 for the x-rails 214*a,b* and *y*-rails 216*a,b* are shown in FIG. 2C.

Figure 3A:
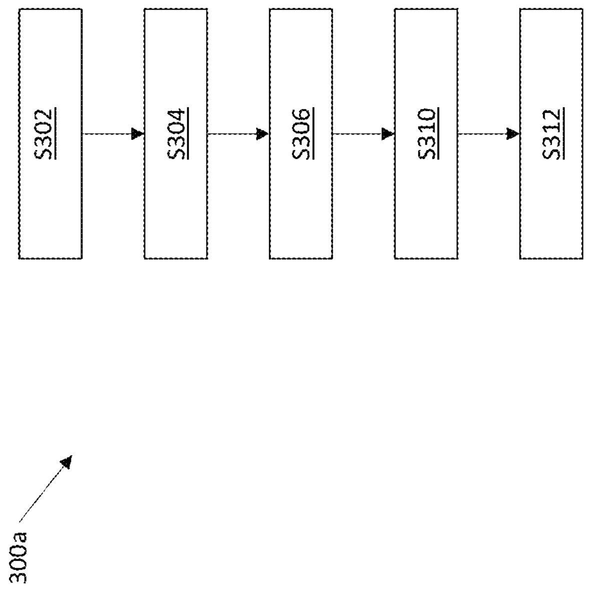
FIG. 3A is a flowchart of an exemplary method for ensuring correct usage of an assembly line tool at a workstation of an assembly line.

FIG. 3A is a flowchart of an exemplary method 300*a* for ensuring correct usage of an assembly line tool at a workstation of an assembly line. The method 300*a* may comprise the following actions, steps or operations.

Action S302. The location of the trolley's 212 position in the x-y plane coordinate system is measured. This is performed by acquiring distance data from ranging and return beams 226*a,b* and 228*a,b* from the x-direction range detector 218 and y-direction range detector 222. Action S304. The position of a cab of the vehicle 102*a,b* to be assembled in the x-y plane coordinate system is determined. This is performed by the cab range detectors 230*a,b*. Action S306. From the vehicle cab position in the x-y plane coordinate system, the location of the chassis in the x-y plane coordinate system can be determined. This can be done since the size of the cab and its relative position on the chassis is well known. Action S310. The location of the tool relative to the location of the chassis is determined. Since the positions of the tool and the chassis in the x-y plane coordinate system are known, their relative positions can be easily determined. Action S312. With the relative position of the tool and the chassis known, the tool can be correctly positioned relative the chassis for correct usage of the tool.

Figure 3B:
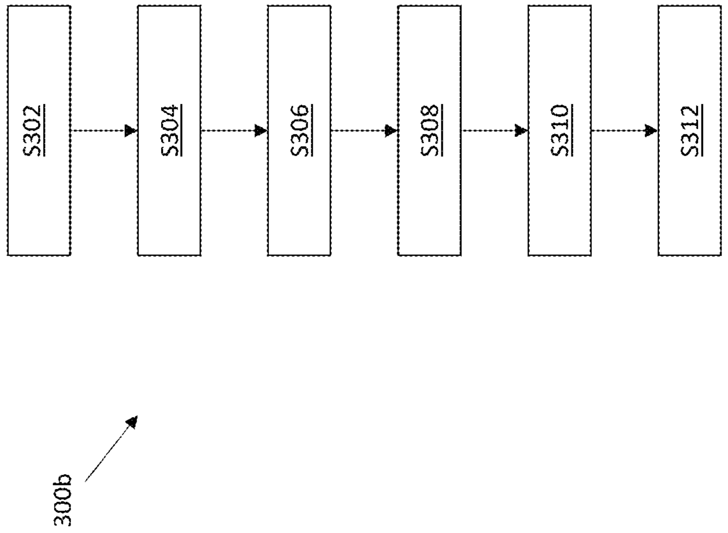
FIG. 3B is a flowchart of an exemplary method for positioning an assembly line tool relative a chassis position.

FIG. 3B is a flowchart of an exemplary method 300*b* for positioning an assembly line tool relative a chassis position. The method 300*b* may comprise the following actions, steps or operations. This method 300*b* is a more detailed variation of the method 300*a* of FIG. 3A and thereby contains some of the same actions, steps or operations.

Action S302. The location of the trolley's 212 position in the x-y plane coordinate system is measured. This is performed by acquiring distance data from ranging and return beams 226*a,b* and 228*a,b* from the x-direction range detector 218 and y-direction range detector 222. Action S304. The position of a cab of the vehicle 102*a,b* to be assembled in the x-y plane coordinate system is determined. This is performed by the cab range detectors 230*a,b*. Action S306. From the vehicle cab position in the x-y plane coordinate system, the location of the chassis in the x-y plane coordinate system can be determined. This can be done since the size of the cab and its relative position on the chassis is well known. Action S308. Once the location of the chassis is known from Action 306, more detailed positions on the chassis can be determined. Continuing with the example of the spindle tool 208, one or more axle positions on the chassis of the truck to be assembled can be determined. This is for instance done via known distances from the cab of each axle and/or by image recognition using an image captured by an image capturing unit. Action S310. The location of the spindle tool 208 relative to the location of the axle position is determined. Since the positions of the tool and the chassis in the x-y plane coordinate system are known, their relative positions can be easily determined or an optical camera can be used to further determine the location. Action S312. With the positions of the spindle tool and the axle known, the spindle tool can be aligned with the axle position for usage of the spindle tool to tighten the bolts of the wheel.

Figure 4:
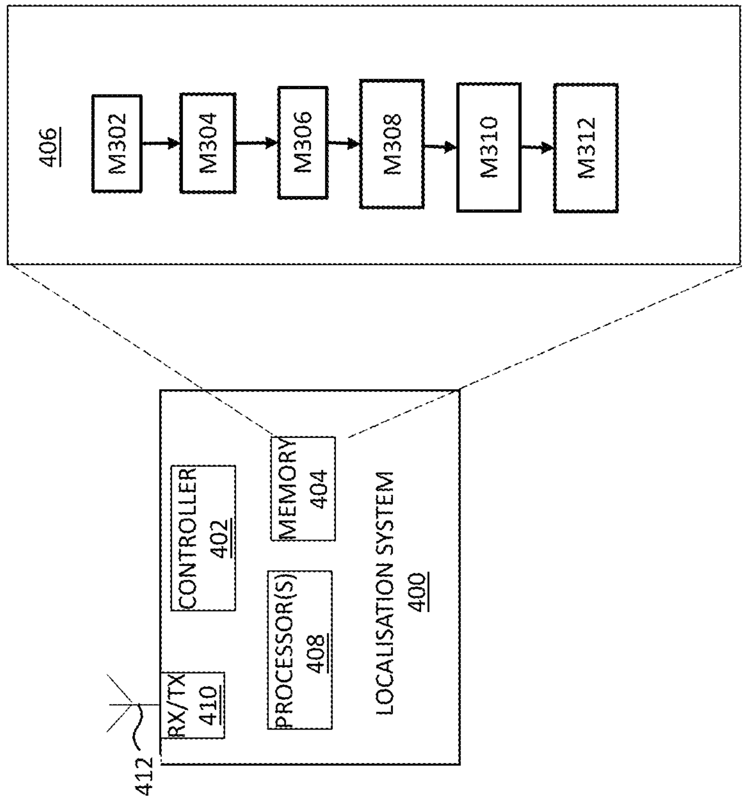
FIG. 4 is an exemplary overview of an assembly line tool localization system.

FIG. 4 is an exemplary overview of an assembly line tool localization system 400. The localisation system 400 comprises a controller 402 configured to connect the localisation system to the one or more first and second range detectors 218, 222, 230*a*, 230*b* of the assembly line arrangement 200. The system 400 further comprises a memory 404, computer code 406, one or more processor(s) or processing circuitry 408, and a data communications transceiver arrangement 410 connected to an antenna 412. The computer code, when loaded from memory 404 and executed by the one or more processors or processing circuitry 408, causes the localisation system 400 to wirelessly connect to the one or more first and second range detectors 218, 222, 230*a*, 230*b* and perform the actions, steps or operations of the methods described above.

Figure 5:
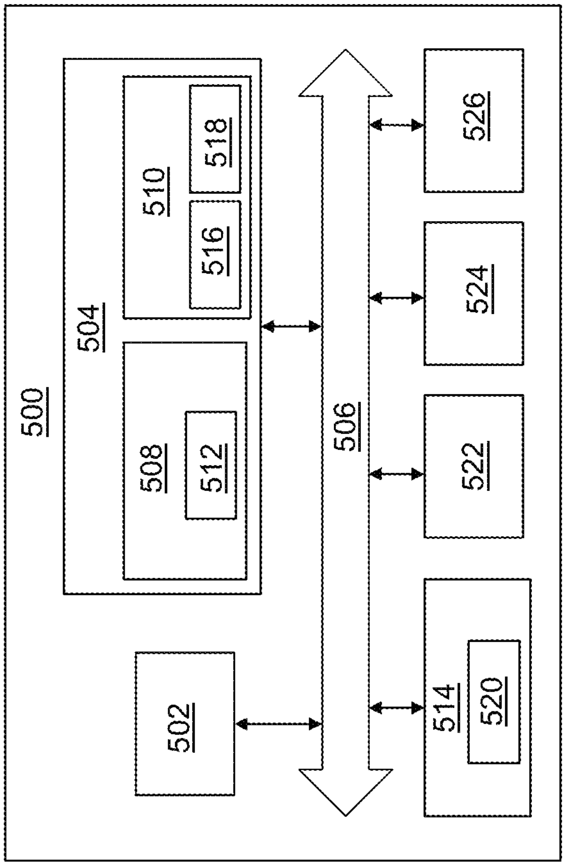
FIG. 5 is a schematic diagram of an exemplary computer system for implementing examples disclosed herein.

FIG. 5 is a schematic diagram of an exemplary computer system 500 for implementing examples disclosed herein. The computer system 500 is adapted to execute instructions from a computer-readable medium to perform these and/or any of the functions or processing described herein. The computer system 500 may be connected (e.g., networked) to other machines in a LAN, an intranet, an extranet, or the Internet. While only a single device is illustrated, the computer system 500 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 500 may comprise at least one computing device or electronic device capable of including firmware, hardware, and/or executing software instructions to implement the functionality described herein. The computer system 500 may include a processor device 502 (may also be referred to as a control unit), a memory 504, and a system bus 506. The computer system 500 may include at least one computing device having the processor device 502. The system bus 506 provides an interface for system components including, but not limited to, the memory 504 and the processor device 502. The processor device 502 may include any number of hardware components for conducting data or signal processing or for executing computer code stored in memory 504. The processor device 502 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 506 may be any of several types of bus structures that may further interconnect to a memory bus (with or without a memory controller), a peripheral bus, and/or a local bus using any of a variety of bus architectures. The memory 504 may be one or more devices for storing data and/or computer code for completing or facilitating methods described herein. The memory 504 may include database components, object code components, script components, or other types of information structure for supporting the various activities herein. Any distributed or local memory device may be utilized with the systems and methods of this description. The memory 504 may be communicably connected to the processor device 502 (e.g., via a circuit or any other wired, wireless, or network connection) and may include computer code for executing one or more processes described herein. The memory 504 may include non-volatile memory 505 (e.g., read-only memory (ROM), erasable programmable read-only memory (EPROM), electrically erasable programmable read-only memory (EEPROM), etc.), and volatile memory 510 (e.g., random-access memory (RAM)), or any other medium which can be used to carry or store desired program code in the form of machine-executable instructions or data structures and which can be accessed by a computer or other machine with a processor device 502. A basic input/output system (BIOS) 512 may be stored in the non-volatile memory 505 and can include the basic routines that help to transfer information between elements within the computer system 500.

The computer system 500 may further include or be coupled to a non-transitory computer-readable storage medium such as the storage device 514, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 514 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 514 and/or in the volatile memory 510, which may include an operating system 516 and/or one or more program modules 515. All or a portion of the examples disclosed herein may be implemented as a computer program product 520 stored on a transitory or non-transitory computer-usable or computer-readable storage medium (e.g., single medium or multiple media), such as the storage device 514, which includes complex programming instructions (e.g., complex computer-readable program code) to cause the processor device 502 to carry out the steps described herein. Thus, the computer-readable program code can comprise software instructions for implementing the functionality of the examples described herein when executed by the processor device 502. The processor device 502 may serve as a controller or control system for the computer system 500 that is to implement the functionality described herein.

The computer system 500 also may include an input device interface 522 (e.g., input device interface and/or output device interface). The input device interface 522 may be configured to receive input and selections to be communicated to the computer system 500 when executing instructions, such as from a keyboard, mouse, touch-sensitive surface, etc. Such input devices may be connected to the processor device 502 through the input device interface 522 coupled to the system bus 506 but can be connected through other interfaces such as a parallel port, an Institute of Electrical and Electronic Engineers (IEEE) 1394 serial port, a Universal Serial Bus (USB) port, an IR interface, and the like. The computer system 500 may include an output device interface 524 configured to forward output, such as to a display, a video display unit (e.g., a liquid crystal display (LCD) or a cathode ray tube (CRT)). The computer system 500 may also include a communications interface 526 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

According to some additional examples, a control system comprising one or more control units configured to perform the method according to any of the examples described above is also provided.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. For instance, the disclosure can be adapted to the location of any assembly line tool attached to a movable trolley guided by roof-mounted rails. In the drawings and specification, there have been disclosed aspects for purposes of illustration only and not for purposes of limitation, the scope of the disclosure being set forth in the following claims.

What is claimed is:

1. An assembly line arrangement comprising an assembly line tool attached to a movable trolley guided by roof-mounted rails comprising x-rails and y-rails arranged perpendicularly relative to each other, the arrangement further comprising:

first range detectors mounted on the roof-mounted rails and/or trolley comprising an x-direction range detector arranged to measure a distance to an x-direction reflector arranged perpendicular to the x-rails and a y-direction range detector arranged to measure a distance to a y-direction reflector arranged perpendicular to the y-rails in order to determine the position of the trolley in a plane defined by the roof-mounted rails by determining an x-coordinate and a y-coordinate of the trolley, and one or more second range detectors mounted on the trolley comprising a cab range detector configured to measure a distance to a predetermined point on a chassis in order to determine the location of a chassis of the vehicle on an assembly line in the x-y plane.

2. The arrangement according to claim 1, wherein the first range detectors are laser range meters and/or actuators.

3. The arrangement according to claim 1, wherein the one or more second range detectors) are LIDAR sensors and/or optical cameras.

4. The arrangement according to claim 1, wherein the assembly line tool is spindle tool comprising a plurality of spindles for tightening bolts of a wheel to the chassis of the vehicle.

5. The arrangement according to claim 1, wherein the arrangement further comprises:

an image capturing unit for determining the position of an axle of the chassis of the vehicle.

6. A computer-implemented assembly line tool localization system comprising:

a controller configured to connect the localisation system to the first range detectors and one or more second range detectors of the arrangement according to claim 1;

memory;

computer code;

one or more processor(s) or processing circuitry; and a data communications transceiver arrangement connected to an antenna;

wherein the computer code, when loaded from memory and executed by the one or more processors or processing circuitry, causes the localisation system to wirelessly connect to the one or more first and second range detectors and perform a method.

7. A computer-implemented method for ensuring correct usage of an assembly line tool at a workstation of an assembly line, wherein the assembly line tool is attached to a movable trolley guided by roof-mounted rails comprising x-rails and y-rails arranged perpendicularly relative to each other, the method comprising determining a location of the assembly line tool based on the position of the trolley in a x-y plane defined by the roof mounted rails by first range detectors mounted on the roof-mounted rails and/or trolley comprising an x-direction range detector arranged to measure a distance to an x-direction reflector arranged perpendicular to the x-rails and a y-direction range detector arranged to measure a distance to a y-direction reflector arranged perpendicular to the y-rails;

determining a location of a chassis of a vehicle at the work station in the x-y plane by one or more second range detectors mounted on the trolley comprising a cab range detector configured to measure a distance to a predetermined point on the chassis;

determining a relation between the determined location of the assembly line tool and the determined location of the chassis at the assembly line work station; and, based on the determined relation between the determined location of the assembly line tool and the determined location of the chassis of the vehicle at the assembly line work station, locating the assembly line tool relative to the chassis of the vehicle for correct usage of the assembly line tool.

8. The computer-implemented method according to claim 7, wherein locating the assembly line tool relative to the chassis of the vehicle for the correct usage of the assembly line tool comprises:

comparing the relation between the determined location of the assembly line tool and the determined location of the chassis of the vehicle at the assembly line work station with a predefined operating procedure of the assembly line tool in relation to the chassis of the vehicle.

9. The computer-implemented method according to claim 7, wherein the method comprises:

determining a location of an axle on the chassis of the vehicle.

10. The computer-implemented method according to claim 9, wherein determining the location of the axle on the chassis of the vehicle comprises:

capturing an image of the chassis of the vehicle with an image capturing unit, and determining the position of the axle of the chassis of the vehicle by image recognition.

11. The computer-implemented method according to claim 7, wherein determining the location of the assembly line tool based on the position of the trolley in the x-y plane defined by the roof mounted rails comprises:

determining the location of the assembly line tool using first range detectors being laser range meters and/or actuators.

12. The computer-implemented method according to claim 7, wherein determining the location of the chassis of a vehicle at the work station;

determining the location of the chassis of the vehicle using the one or more second range detectors being LIDAR sensors and/or optical cameras.

13. The computer-implemented method according to claim 7, wherein the assembly line tool is spindle tool comprising a plurality of spindles for tightening bolts of a wheel to the chassis of the vehicle.

14. A non-transitory computer-readable storage medium comprising instructions, which when executed by the processing circuitry, cause the processing circuitry to perform the method of claim 7.

* * * * *